US012695015B2

(12) United States Patent
Dams et al.

(10) Patent No.: US 12,695,015 B2
(45) Date of Patent: Jul. 28, 2026

(54) ELECTROMAGNETIC ACTUATOR AND VALVE HAVING THE ELECTROMAGNETIC ACTUATOR

(71) Applicant: MAGNETIC INNOVATIONS B.V., Veldhoven (NL)

(72) Inventors: Johannes Adrianus Antonius Theodorus Dams, Veldhoven (NL); Rob Leonardus Hubertus Sanders, Veldhoven (NL); Stefan Albert Johan Folmer, Overasselt (NL)

(73) Assignee: MAGNETIC INNOVATIONS B.V., Veldhoven (NL)

( * ) Notice: Subject to any disclaimer, the term of this patent is extended or adjusted under 35 U.S.C. 154(b) by 353 days.

(21) Appl. No.: 18/251,618

(22) PCT Filed: Nov. 4, 2021

(86) PCT No.: PCT/EP2021/080588
§ 371 (c)(1),
(2) Date: May 3, 2023

(87) PCT Pub. No.: WO2022/096548
PCT Pub. Date: May 12, 2022

(65) Prior Publication Data
US 2023/0420170 A1 Dec. 28, 2023

(30) Foreign Application Priority Data
Nov. 5, 2020 (NL) ...................................... 2026835

(51) Int. Cl.
*H01F 7/16* (2006.01)
*F16K 31/06* (2006.01)
*F16K 31/08* (2006.01)

(52) U.S. Cl.
CPC ....... *H01F 7/1615* (2013.01); *F16K 31/0679* (2013.01); *F16K 31/082* (2013.01); *H01F 2007/1692* (2013.01)

(58) Field of Classification Search
None
See application file for complete search history.

(56) References Cited

U.S. PATENT DOCUMENTS 7,474,018 B2 * 1/2009 Shimizu ................. H02K 33/06
310/15
7,511,478 B2 3/2009 Ganev
(Continued)

FOREIGN PATENT DOCUMENTS

DE 102005058376 A1 6/2006
DE 102013011759 A1 1/2015
(Continued)

*Primary Examiner* — Bernard Rojas
(74) *Attorney, Agent, or Firm* — FisherBroyles, LLP; Roger L. Browdy; James E. Mrose

(57) ABSTRACT

There is provided electromagnetic actuator. The electromagnetic actuator comprises a mover, a tubular coil and a tubular coil holder. The mover has a magnet. The tubular coil holder holds the tubular coil. The tubular coil holder has a cylindrical inner space for receiving the mover. The tubular coil and the magnet are configured to cooperate with each other to generate a force to move the mover relative to the coil holder along an axial axis. The mover comprises a ferromagnetic element arranged to change an inductance of the tubular coil in dependency on a position of the mover relative to the tubular coil holder. Further, there is provided a valve for opening and closing a conduit. The valve comprises the electromagnetic actuator.

14 Claims, 7 Drawing Sheets

(56)          References Cited

U.S. PATENT DOCUMENTS

Figure 1:
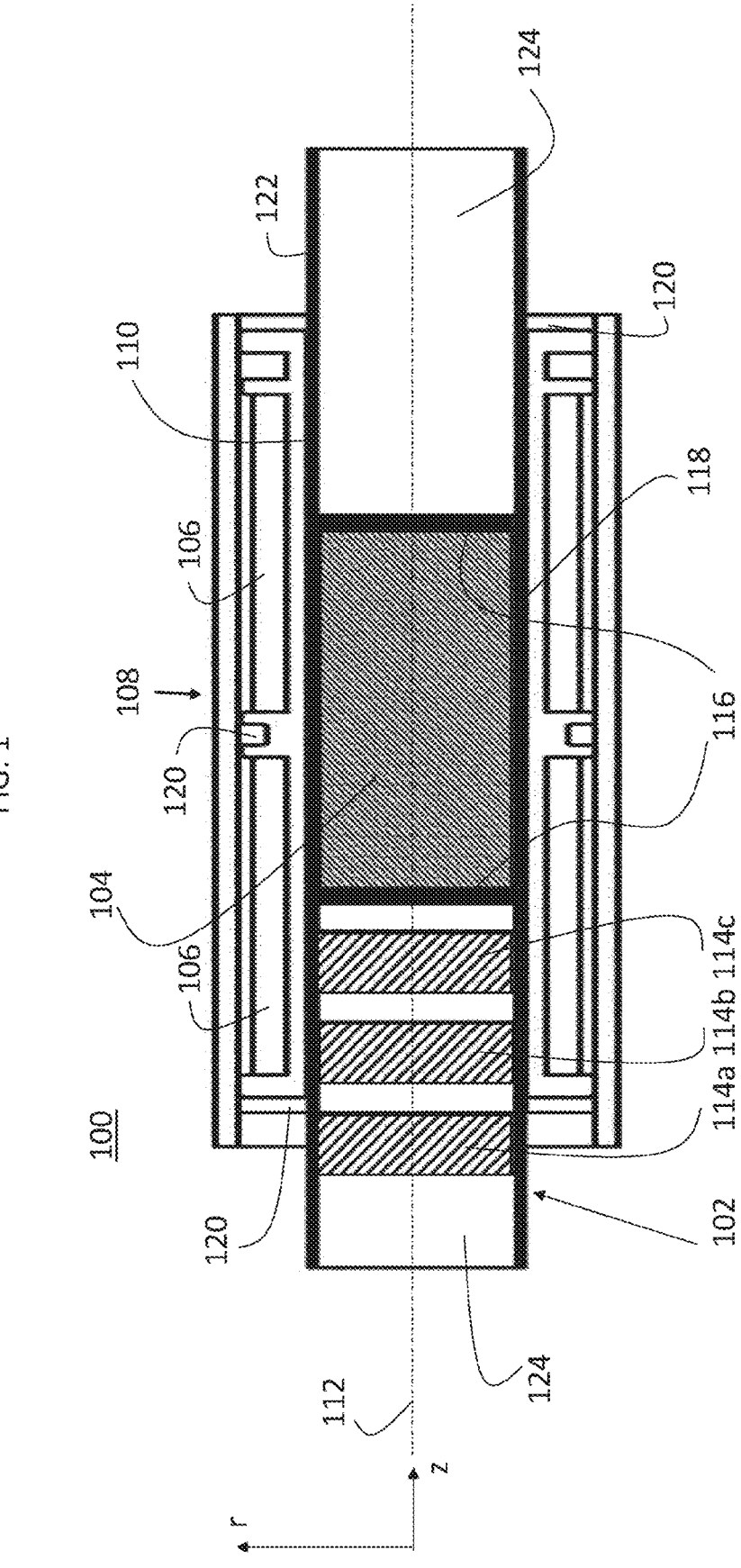

|  |  |  |  |  |  |
|---|---|---|---|---|---|
| 7,825,548 | B2 * | 11/2010 | Maemura | ............... | H02K 41/03 |
|  |  |  |  |  | 310/12.21 |
| 10,399,122 | B2 * | 9/2019 | Akanuma | .............. | H02K 33/16 |
| 2021/0142936 | A1 * | 5/2021 | Tyler | .................... | H01F 7/1615 |

FOREIGN PATENT DOCUMENTS

| JP | 2012038813 A | 2/2012 |
|----|--------------|--------|
| WO | 2019156564 A1 | 8/2019 |

* cited by examiner

ELECTROMAGNETIC ACTUATOR AND VALVE HAVING THE ELECTROMAGNETIC ACTUATOR

TECHNICAL FIELD

The invention relates to an electromagnetic actuator. In particular, the invention relates to a valve having the electromagnetic actuator for opening or closing the valve.

BACKGROUND

An electromagnetic actuator, such as a Lorentz actuator, is an actuator that makes use of a magnetic field and an electric current to generate an electromagnetic force. The electromagnetic actuator can have a cylindrically wound coil. Along the axial axis of the coil, a magnet is arranged. The magnet is moveable relative to the coil. When an electrical current is applied to the coil, the coil generates a magnetic field. The magnetic field generated by the coil interacts with the magnetic field of the magnet. As a result, the two magnetic fields generate a magnetic force between the magnet and the coil along the axial axis of the coil. The magnetic force is sometimes referred to as Lorentz force or electromagnetic force. The direction of the magnetic force along the axial axis and the magnitude of the magnetic force depend on the magnetic field of the magnet, the number of turns of the coil and the electric current through the coil. By controlling the electric current through the coil, the direction of the magnetic force along the axial axis, and the magnitude of the magnetic force can be controlled.

In many applications, the electromagnetic actuator is used as a position actuator. In such an application, the magnetic force is used to move a body from a first position to a second position. By controlling the electrical current through the coil, the electromagnetic actuator generates the magnetic force to move the body to a desired position.

To ensure the body has reached the desired position, typically a position sensor is used. The position sensor generates a signal based on the actual position of the body. The signal is fed to a control unit. Based on the signal, the control unit controls the electric current through the coil to move the body to the desired position. Adding the position sensor adds complexity and costs, because additional hardware and software is needed.

To reduce this complexity, developments have been done to determine the actual position of the body without adding an additional position sensor. U.S. Pat. No. 7,511,478 B2 discloses such a development. The patent discloses an actuator that is able to move over a stroke. When the actuator is at a start position, there is a minimum air gap in the drive direction of the actuator. When the actuator is at an end position, there is a maximum air gap in the drive direction. A modulated voltage is provided to the coil of the actuator. The modulated voltage generates an electric current through the coil. Due to the modulated voltage, the electric current has a ripple. Based on the modulated voltage and the ripple of the electric current, an inductance of the coil is determined. The ripple of the electric current, and thus the inductance of the coil, depend on the air gap. By determining the inductance of the coil, the air gap can be determined. By determining the air gap, the actual position of the actuator can be determined. By determining the position of the actuator using the inductance of the coil, no additional position sensors are needed.

A disadvantage of the know actuator is that the inductance of the coil changes at lot in dependency of the stroke. Due to the large change of the inductance over the stroke, the voltage over the coil increases a large amount over the stroke. The large voltage requires expensive electronics to provide the large voltage. The voltage due to the inductance of the coil may be substantially larger than the voltage due to the electrical resistance or the back electromotive force (back EMF) of the electromagnetic actuator. The back EMF is a voltage that is caused by movement of the magnet relative to the coil. Due to the large change of the inductance over the stroke, the voltage due to the inductance of the coil may become significantly larger than the sum of the voltage due to the electrical resistance and the back EMF. Also, additional insulation is needed to provide a safe electromagnetic actuator and to prevent electric discharges in the coil, and electric discharges between the coil and the mover. To prevent electric discharge between the coil and the mover, a large air gap needs to be present between the coil and the mover. However, this large air gap reduces the efficiency of the electromagnetic actuator, because magnetic flux needs to cross the large air gap. The larger the air gap, the smaller the magnetic flux that crosses the air gap.

SUMMARY OF THE INVENTION

A goal of the invention is to provide an improved electromagnetic actuator, or at least to provide an alternative electromagnetic actuator.

The goal of the invention is achieved by providing an electromagnetic actuator. The electromagnetic actuator comprises a mover, a tubular coil and a tubular coil holder. The mover has a magnet. The tubular coil holder holds the tubular coil. The tubular coil holder has an inner space for receiving the mover. The tubular coil and the magnet are configured to cooperate with each other to generate a force to move the mover relative to the tubular coil holder along an axial axis. The mover comprises a ferromagnetic element arranged to change an inductance of the tubular coil in dependency on a position of the mover relative to the tubular coil holder. The magnet and the ferromagnetic element are arranged on the mover at an axial offset from each other.

Because the mover comprises the ferromagnetic element, the ferromagnetic element is moved along with the magnet along the axial axis relative to the tubular coil. The ferromagnetic element is moved along the magnetic field that is generated by the tubular coil to generate the force between the magnet and the tubular coil. The ferromagnetic element influences the magnetic field, because of the ferromagnetic properties of the ferromagnetic element. The ferromagnetic properties of the ferromagnetic element cause a difference in the magnetic field at the position of the ferromagnetic element compared to a position away from the ferromagnetic element. The ferromagnetic element increases the magnetic flux or magnetic field due to the increased permeability along the magnetic flux path.

The dimensions of the ferromagnetic element are chosen to change the inductance of the coil over the stroke sufficiently to determine the change accurately enough. However, the dimensions of the ferromagnetic element are chosen not to change the inductance of the coil over the stroke too much, to prevent the voltage over the coil to become too large. To achieve a desired change of the inductance over the stroke the dimensions such as a length, a width, a thickness, an inner dimension, or a diameter is selected for the ferromagnetic element.

The inductance depends on the number of turns of the tubular coil, the length of the tubular coil, the winding area of the tubular coil and the permeability. By increasing the permeability, the inductance of the tubular coil increases. The inventors have found that by adding the ferromagnetic element to the mover to change the inductance of the coil, the inductance of the coil changes sufficiently per unit of movement of the mover to accurately determine the position, without excessively increasing the total amount of induction of the coil. The total amount of induction of the coil comprises of a basis induction and a position-depending induction caused by the ferromagnetic element. The basis induction is determined by the design and the components of the electromagnetic actuator. Some part of the basis induction could be caused by the ferromagnetic element. However, the ferromagnetic element causes the position-depending induction that allows the position of the mover to be determined. Ideally, the basis induction is a low as possible, and the position-depending induction is just sufficiently large to accurately determine the position.

The mover has the magnet that cooperates with the tubular coil to move relative to the tubular coil. The mover has, for example, a frame such as a cylindrical frame, to which the magnet is mounted. In another example, the magnet forms a structural part of the mover.

The mover moves relative to the tubular coil. In an example, the tubular coil is stationary and the mover moves. In another example, the mover is stationary and the tubular coil moves. In yet another example, both the mover and the tubular coil move, for example in opposite directions.

The magnet as applied in an actuator according to the invention is a permanent magnet or an electro-magnet. A permanent magnet comprises magnetic material or material that has been magnetized. An electro-magnet is a magnet that generates a magnetic field when an electric current flows through the electro-magnet. For example, the electro-magnet has coils that generate a magnetic field when an electric current flows through the coils. The magnet is preferably axially magnetized, i.e., magnetized along the axial axis. An axially magnetized magnet has the north pole on one side of the magnet along the axial axis, whereas the south pole is on the opposite side of the magnet along the axial axis. The magnet may comprise, for example, multiple magnet elements. The magnet elements, for example, are arranged in an array of permanent magnets along the axial axis. The multiple magnet elements are, for example, separated from each other. In between the multiple magnet elements a material, such as a ferromagnetic material, may be arranged.

The tubular coil is a coil that is formed by electrically conductive wire that is wound tangentially along the axial axis. In the radial direction of the coil, a single layer of wire is wound or multiple layers of wire are wound. The amount of magnetic field the tubular coil can generate, i.e., the "Magnetomotive Force" (MMF), depends on the number of turns of the tubular coil and the amperage of the electric current through the tubular coil. The cross-section of the electrically conductive wire of the tubular coil is for example round or square or rectangular or hexagonal or foil shaped. The wire is covered with an insulation layer to prevent a short-circuit between different parts of the wire. Preferably, the wire is wound as tightly together as possible to achieve the highest efficiency. Space between the windings and/or space between the tubular coil and the tubular coil holder is for example filled with an impregnating or potting/casting compound, such as epoxy or polyurethane or polybutadiene, or silicone. The compound may help to fix the tubular coil to the tubular coil holder and/or fix the windings to each other. The compound may further provide an improved electrical insulation and/or provide an improved heat path from the tubular coil to the tubular coil holder. Via the improved heat path, heat generated by the tubular coil is more easily transferred away from the tubular coil, which helps to prevent overheating of the tubular coil. For example, the tubular coil is formed by winding the wire along the tubular coil holder. In another example, the tubular coil is formed on a bobbin of a winding machine. The windings of the tubular coil are then fixated together, for example by curing a layer of glue between the windings, e.g. to obtain a self-supporting coil. The tubular coil is then removed from the bobbin to be assembled in the electromagnetic actuator according to the invention. Although it may require additional work to create the tubular coil in such a way compared to winding the tubular coil along the tubular coil holder, this way the windings of the tubular coil can be placed closer to the magnet on the mover. As a result, the electromagnetic actuator becomes more efficient. The tubular coil may have portions of the wire that are not wound, for example wire at an edge of the coil to provide an electrical connection to the windings of the tubular coil, or for example, wire that connects two portions of the tubular coil with wound wire.

The tubular coil holder is for example made from one or more of the following materials:

injection molded plastics, e.g., nylon, polytetrafluorethylene (PTFE), a polyamide composite, a thermoplastic, a composite material such as carbon or Kevlar or other organic fibre, a metallic material such as steel, bronze, tin-bronze, aluminum-bronze.

In an example, the tubular coil holder is made from anodized aluminum. Such a tubular coil holder is for example coated with a PTFE coating or the like, e.g., to reduce friction. For example, the tubular coil holder is non-magnetic.

The inner space of the tubular coil holder is for example formed by an inner surface of the tubular coil holder. One or both of the ends of the cylindrical inner space are for example open to receive the mover. In another example the ends of the cylindrical inner space are closed after the mover has been inserted into the inner space. In that example, the ends of the inner space are at sufficient distance from each other to allow the mover to move along the desired stroke. A closed end of the inner space has, for example, an opening for receiving a drive rod. The drive rod is configured to couple the mover to a body that is to be positioned by the mover. In another example, the inner space is formed by an inner surface of the tubular coil. The windings of the tubular coil may form the inner space or the tubular coil may be provided with an additional layer radially inward of the windings. In that case, the inner space is formed by the additional layer.

In an example, the mover is a cylindrical mover extending in the axial direction. Optionally the magnet and/or the ferromagnetic element are cylindrical. The inner space is a cylindrical inner space extending in the axial direction. The diameter of the inner space is for example significantly smaller than the length of the inner space. In another example, the diameter of the inner space is significantly larger than the length of the inner space.

The tubular coil and the magnet are able to generate the force due to the Lorentz force that is created when the magnetic field of the magnet and the electric current of the tubular coil interact. This force is further referred to as magnetic force. By increasing the electric current through the coil, the magnetic force is increased. By reversing the electric current through the coil, the magnetic force is reversed. By controlling the electric current through the tubular coil, the magnitude and the direction of the magnetic force provided by the electromagnetic actuator is controlled. The electromagnetic actuator has the advantage that there is no direct physical contact between the tubular coil and the magnet. No direct physical contact means that there is no component coupling the tubular coil to the magnet. Due to the absence of direct physical contact between the tubular coil and the magnet, no or hardly any vibrations propagate from the tubular coil to the magnet and vice versa. Depending on the application in which the electromagnetic actuator is used, there may be indirect physical contact between the tubular coil and the magnet. For example, indirect physical contact is caused by a seal that seals a gap between the mover and the tubular coil holder, or by a bearing that constrains movement of the mover relative to the tubular coil holder in a direction other than along the axial axis.

The ferromagnetic element as applied in the actuator according to the invention comprises, for example, iron or cobalt or nickel or any combination of those materials. The ferromagnetic element has, preferably, a permeability that is substantially larger than the permeability of air. For example, the permeability is 1000 or 10000 or 100.000 or more times larger than the permeability of air. By moving the ferromagnetic element along the cylindrical inner space, the inductance of the tubular coil is changed. The inductance of the tubular coil depends on the permeability of the material inside the cylindrical inner space, the number of turns of the tubular coil and the length of the tubular coil according to the following formula:

$$L = \mu N^2 A / l \qquad (1)$$

wherein L is the inductance of the tubular coil in henry [H]

$\mu$ is the permeability in the cylindrical inner space in henries per meter [H/m]

N is the number of turns of the tubular coil [-]

A is the surface area of the cross-section of the windings in [m$^2$], and l is the length of the tubular coil in [m]

By moving the mover along the inner space, the ferromagnetic element changes the permeability in dependency on the position of the mover relative to the tubular coil holder.

By arranging the magnet and the ferromagnetic element at the axial offset from each other, the magnetic flux is able to flow between the magnet and the tubular coil without any substantial disturbance of the ferromagnetic element. The axial offset is a distance between the magnet and the ferromagnetic element directed along the axial axis. In an example, one of the magnet and the ferromagnetic element or both are arranged on the axial axis. In another example, one of the magnet and the ferromagnetic element or both are arranged at a radial offset from the axial axis. By providing the axial offset between the magnet and the ferromagnetic element, the magnetic flux between the tubular coil and the magnet does not significantly propagate via the ferromagnetic element. For example, the ferromagnetic element changes the magnetic flux between the tubular coil and the magnet less than 5% or less than 2% or less than 1%. The offset is for example, 0.5 mm or 1 mm or 2 mm or 5 mm. A material with a low magnetic permeability, such as aluminum or brass, and preferably also a low electrical conductivity such as a plastic, is for example arranged in between the magnet and the ferromagnetic element. Such materials have a much lower magnetic permeability than the ferromagnetic element, for example 10 times or 100 times or 1000 times lower.

In an embodiment, the electromagnetic actuator is configured to determine the inductance of the tubular coil. The electromagnetic actuator is configured to control the position of the mover relative to the tubular coil holder based on the determined inductance of the tubular coil.

According to this embodiment, the electromagnetic actuator is configured to determine the inductance of the tubular coil. For example, the electromagnetic actuator is configured to determine the inductance by making use of the relationship between the inductance of the tubular coil, the voltage applied to the tubular coil and the current through the tubular coil according to the following formula:

$$V = L \, dI/dt \qquad (2)$$

wherein V is the voltage applied to the tubular coil [V],

L is the inductance of the tubular coil in henry [H]

dI/dt is the time derivative of the electric current through the tubular coil [A/s]

The electromagnetic actuator is, for example, arranged to apply a voltage to the tubular coil and is arranged to determine an electric current through the tubular coil, and is configured to determine the inductance of the tubular coil based on the formula above. The electromagnetic actuator is, for example, arranged to supply an electric current to the tubular coil and is arranged to determine a voltage over the tubular coil, and is configured to determine the inductance of the tubular coil based on the formula above. The electromagnetic actuator is, for example, configured to use an algorithm or a look-up table or calibration information to determine the position of the mover relative to the tubular coil holder. In order to apply a voltage or current to the tubular coil of the actuator, the electromagnetic actuator according to the present invention can comprise a power source for supplying the required voltage or current. Alternatively, the electromagnetic actuator according to the present invention can be configured to be connected to a power supply. In such case, the electromagnetic actuator according to the present invention can be configured to receive the required voltage or current for the tubular coil from said power supply.

The relationship between the inductance of the tubular coil and the position of the cylindrical mover relative to the tubular coil holder is for example determined as follows. During a calibration of the electromagnetic actuator, the mover is slowly moved till the cylindrical mover reaches the end of the stroke. This can be realized by supplying a current to the tubular coil, the current e.g., be controlled by a controller of the electromagnetic actuator. The mover cannot move any further and is stopped from moving further by an end stop or a bumper or any other mechanical feature that is configured to prevent the mover from moving beyond the end of the stroke. At the end of the stroke, the mover pushes against the mechanical feature. When attempting to move further, the controller of the actuator may control the current through the coil to increase. The increase of the electrical current is determined for example by a current sensor. Then, the mover is moved back a little to ensure a small space between the cylindrical mover and the mechanical feature. At this position of the mover, i.e., at a small distance from the mechanical feature, the inductance of the tubular coil is determined, which marks the end of the stroke during operational use of the electromagnetic actuator. Similar, the inductance of the tubular coil is determined when the mover is at a small distance from the mechanical feature at the opposite side of the stroke. In this way, the inductance of the tubular coil is determined while the mover is at the beginning of the stroke and while the mover is at the end of the stroke. The inductance of the tubular coil for positions in between beginning of the stroke and at the end of the stroke is in between the inductance at the beginning of the stroke and at the end of the stroke.

In another example, the relationship between the inductance of the tubular coil and the position of the mover relative to the tubular coil holder is for example determined as follows. The mover is moved to a desired position, for example manually by pushing or pulling the mover by hand, or by manually controlling the voltage or the electric current to move the mover till the mover reaches the desired position. At the desired position, the inductance of tubular coil is determined. The desired position is, for example, one of the end of stroke positions. Similarly, the other end of stroke position is determined. Instead or alternative to the end of stroke positions, any other type of desired position can be calibrated this way. For example, the desired position is a desired switch position of a switch that is actuated by the electromagnetic actuator. In another position, the desired position is the position of a valve that is actuated by the electromagnetic actuator. The valve position is for example a position in which the valve is completely open, completely closed or half open or a quarter open.

The electromagnetic actuator is for example provided with a controller that is configured to determine the position of the mover relative to the tubular coil holder based on the change of inductance of the tubular coil. The controller, for example, uses a mathematical position calculation, such as a linear or higher order calculation, to determine the position based on the change in inductance. A linear order calculation requires only limited computing power, but may be less accurate. A higher order calculation may provide a more accurate calculation, but requires a more sophisticated controller. Depending on the required accuracy and the desired costs of the electromagnetic actuator, the controller is selected. Alternatively or in addition, the controller is provided with a look-up table. The look-up table comprises data to link a limited amount of inductance values to corresponding positions. Based on a current inductance of the tubular coil, the controller selects from the look-up table the corresponding position. The values in the look-up table are for example determined by calibrating the electromagnetic actuator by using an external measuring device. The controller is, for example, configured to interpolate between the values in the look-up table, for example by using the mathematical position calculation as described above.

In an embodiment, each of the magnet and the ferromagnetic element is aligned with the axial axis.

The magnet and the ferromagnetic element are arranged in alignment with the axial axis, i.e., arranged behind each other along the axial axis. When going along the axial axis, first the magnet is arranged on the axial axis and secondly the ferromagnetic element is arranged on the axial axis, or vice versa. By arranging the magnet and the ferromagnetic element along the axial axis, a radial dimension of the mover can be minimized. By minimizing the radial dimension of the mover, the tubular coil can be arranged as closely to the magnet and the ferromagnetic element as possible. The closer the tubular coil is arranged to the magnet, the more magnetic flux from the magnet perpendicularly passes the tubular coil, resulting in a more efficient electromagnetic actuator. For example, the magnet is arranged axisymmetrical or rotational-symmetrical to the axial axis. For example, the ferromagnetic element is arranged axisymmetrical or rotational-symmetrical to the axial axis.

In an embodiment, the ferromagnetic element is arranged on the mover non-rotational-symmetrical relative to the axial axis.

According to this embodiment, the ferromagnetic element is arranged on the mover neither in an axisymmetrical arrangement nor in a rotational-symmetrical arrangement. For example, the ferromagnetic element is arranged at a radial offset from the axial axis. For example, the center of mass of the ferromagnetic element is arranged at a radial offset from the axial axis. For example, the ferromagnetic element has a square shape or a rectangular shape or an arc shape, wherein the center of the shape is arranged at a radial offset from the axial axis. The non-rotational-symmetrical arrangement of the ferromagnetic element allows for an increased freedom for the design of the mover. For example, the non-rotational-symmetrical arrangement may free up space for arranging another component of the mover. In the non-rotational-symmetric arrangement, the ferromagnetic element causes the change of the inductance in dependency of the position of the mover.

In an embodiment, the mover comprises a pole shoe or a pair of pole shoes arranged adjacent to and in contact with the magnet. The pole shoe or pole shoes are configured to direct a magnetic field of the magnet. The ferromagnetic element is arranged at an axial offset from the pole shoe or pole shoes.

According to the embodiment, a pole shoe or pair of pole shoes is arranged on the mover. The pole shoe or pole shoes direct the magnetic field of the magnet towards the tubular coil to increase the efficiency of the electromagnetic actuator. By arranging the ferromagnetic element at the axial offset from the pole shoe or pole shoes, the ferromagnetic element causes the change in inductance in dependency of the position of the mover.

In an embodiment, each of the magnet and the ferromagnetic element has a cylindrical shape concentrically aligned with the axial axis.

According to this embodiment, the radial dimension of the magnet and the radial dimension of the ferromagnetic element can be maximized, which brings the magnet and the ferromagnetic element as close as possible to the tubular coil. The closer the magnet is arranged to the tubular coil, the more efficient the electromagnetic actuator becomes.

In an embodiment, the ferromagnetic element comprises a plurality of elements. The elements are arranged along the axial axis at a distance from each other.

Arranging a single ferromagnetic element on the mover, allows the ferromagnetic element to change the inductance in dependency of a position of the mover over a certain stroke. However, by providing the plurality of elements, the inductance of the tubular coil changes per unit of movement over a larger stroke. If a larger stroke of the mover is desired, more ferromagnetic elements could be provided at a distance from the other ferromagnetic elements. By providing the plurality of elements, sufficient change in inductance per unit of movement is achieved, without excessively increasing the total amount of inductance. In comparison, adding a single large ferromagnetic element would increase the total amount of inductance to an unacceptable level. This could distort the linear relationship between the mover position and change of inductance of the tubular coil per unit of movement. The distances between the elements are selected to optimize the change of the inductance per unit of movement. Preferably, the relationship between the inductance of the tubular coil and the position of the mover is a linear or substantially linear relationship. This linear relationship allows for an accurate determination of the position of the mover. By selecting proper distances between the elements along the axial direction, such a relationship is achieved.

In an embodiment, the elements are arranged asymmetrically relative to the magnet along the axial axis.

According to the embodiment, there are more elements on one side of the magnet along the axial axis than on the other side of the magnet along the axial axis. For example, there are one, two, three or four elements on one side of the magnet, whereas there are no elements on the other side of the magnet. For example, all of the plurality of elements are arranged on one side of the magnet. For example, there are two elements on one side of the magnet, whereas there is one element on the other side of the magnet. In another example, there are four elements on one side of the magnet, whereas there is one element on the other side of the magnet. An advantage of having the elements arranged asymmetrically relative to the magnet along the axial axis is that the ferromagnetic elements create a change in the inductance of the tubular coil per unit of movement, without excessively increasing the basis induction.

In an embodiment, each of the elements are concentrically aligned with the axial axis. Each of the elements has a thickness different from the other elements.

According to this embodiment, each of the elements has a thickness that is different from the thickness of the other elements. The thickness of the elements is the dimension along the axial axis. By selecting a unique thickness of each of the elements, the change of the inductance of the tubular coil per unit of movement of the mover relative to the tubular coil holder is increased and/or is made more linear. This way, the electromagnetic actuator is able to determine the position of the mover relative to the tubular coil holder more accurately.

In an embodiment, each of the elements has a ring shape concentrically aligned with the axial axis. Each of the elements has an inner diameter that is different from the other elements.

According to the embodiment, each of the elements has a unique inner diameter that is different from the inner diameters of the other elements. In an embodiment, each element additionally has a unique thickness different from the thickness of the other elements. The inner diameter of the element is in the radial direction of the mover. By providing each of the elements with a unique inner diameter that is different from the inner diameters of the other elements, the change of the inductance of the tubular coil per unit of movement of the mover relative to the tubular coil holder is increased and/or is made more linear. Any non-linear behavior of the inductance change can also be calibrated out by using a correction table or the like that indicates, for a measured inductance, the corresponding correct position of the coil holder relative to the mover. In addition or alternatively, the mass of the ferromagnetic element is reduced without significantly reducing the change of the inductance of the tubular coil per unit of movement of the mover relative to the tubular coil holder. Especially in high speed and high acceleration applications, it is desirable to reduce the mass of the mover as much as possible to reduce the amount of electrical power that the electromagnetic actuator needs to achieve a desired acceleration or speed. Further, it is desirable to reduce the mass of the mover as much as possible in case the axial axis is vertical or has a large vertical component, and the electromagnetic actuator has to provide a constant magnetic force to compensate for gravity.

In an embodiment, the tubular coil extends in a direction along the axial axis from a first plane to a second plane. The mover is moveable between a first position and a second position. In the first position at least one element is in between the first plane and the second plane. In the second position the at least one element is beyond a position between the first plane and the second plane.

According to this embodiment, the tubular coil protrudes from the first plane to the second plane along the axial axis, or vice versa. The first plane and the second plane are, for example, perpendicular to the axial axis. The first position is a position on the axial axis between the first plane and the second plane. The first position is thus in a space radially enclosed by the tubular coil. Briefly stated, in the first position the at least one element is inside the tubular coil. The second position is beyond a position between the first plane and the second plane. For example, the second position is at a side of the first plane facing away from the second plane. For example, the second position is at a side of the second plane facing away from the first plane. The second position is thus outside the space radially enclosed by the tubular coil. Briefly stated, in the second position the at least one element is outside the tubular coil. In the first position, the element is inside the tubular coil, which causes the element to have a large influence on the inductance of the tubular coil. In the second position, the element is outside the tubular coil, which causes the element to have no or hardly any influence on the inductance of the tubular coil. By moving the element from the first position to the second position or vice versa, the element causes a large change in the inductance of the tubular coil. This way, the element cause a large change of the inductance of the tubular coil per unit of movement of the mover relative to the tubular coil holder. Because the element is outside the tubular coil in the second position, the element does not or does not significantly contribute to the basis induction.

In an embodiment, the inner space is formed by a slide bearing surface. The mover is configured to slide over the slide bearing surface along the axial axis.

According to this embodiment, the mover is in contact with the tubular coil holder. This brings the magnet and the ferromagnetic element as close as possible to the tubular coil, so the magnetic force per unit of electric current through the tubular coil is maximized. The slide bearing surface prevents that the contact between the mover and the tubular coil holder causes damage to the mover and the tubular coil holder. Also, the slide bearing surface provides a simple, but effective bearing that allows the mover to move along the axial axis relative to the tubular coil holder, and constrains the mover relative to the tubular coil holder in the directions perpendicular to the axial axis. For example, the slide bearing surface is a surface of the tubular coil holder. The tubular coil holder is made from a material, such as a ceramic or a glass or a plastic that is suitable to use as a slide bearing surface.

In an embodiment, the mover comprises a tube. The magnet and the ferromagnetic material are arranged inside the tube. The tube can e.g. be or comprises a stainless steel tube or a tube made from or comprising glass, ceramic material or carbon.

According to an embodiment, the ferromagnetic element and the magnet are arranged inside a stainless steel tube. The stainless steel tube, for example, forms a frame in which the magnet and the ferromagnetic element are mounted. Additional material may be added in the stainless steel tube, for example, to separate the magnet from the ferromagnetic element along the axial axis. The high wear resistance of stainless steel makes the stainless steel tube especially suited to cooperate with the slide bearing surface on the tubular coil holder. The inventors have discovered that, although the stainless steel tube is electrically conductive and could influence the magnetic field in the electromagnetic actuator, the stainless steel tube has hardly any influence on the change of inductance of the tubular coil per unit of movement of the mover relative to the tubular coil holder. Preferably, the wall thickness of the stainless steel tube is made as thin as possible to reduce the mass of the mover, its frequency depending impact on the inductance and to achieve a minimum air gap or gap between the tubular coil and the magnet.

In an embodiment, the coil comprises a first coil and a second coil. The first coil and the second coil are wound tangentially around the inner space in a direction opposite to each other.

According to this embodiment, the first coil is for example wound in a clock-wise direction, whereas the second coil is wound in an anti-clock-wise direction. The tubular coil comprises a connection to connect the first coil with the second coil. For example, the connection is a wire. In an example, the first coil, the second coil and the connection are made from a single wire. In another example, the connection connecting the first coil and the second coil is for example a solder joint or a weld seam or a fuse-connection. The first coil faces one end of the magnet, whereas the second coil faces the other end of the magnet along the axial axis. Because the first coil and the second coil are wound in opposite directions, the electric currents through the first coil and the second coil are arranged relative to the magnet to efficiently create the magnetic force.

In an embodiment, the tubular coil holder comprises a ferromagnetic ring arranged concentrically aligned with the axial axis. The ferromagnetic ring and the magnet are configured to generate an axial bias force between the coil holder and the mover.

According to this embodiment, the ferromagnetic ring locally increases the magnetic flux caused by the magnetic field of the magnet. When there is no electric current flowing through the tubular coil, the tubular coil does not generate a magnetic field, so only the magnet generates a magnetic field. Due to the increased magnetic flux, the ferromagnetic ring causes a force to be generated between the magnet and the ferromagnetic ring. The force axially pushes or pulls the magnet to a position near the ferromagnetic ring. This force is referred to as an axial bias force. This position is referred to as the bias position. The bias force pushes or pulls the magnet, and thus the mover, to the bias position along the axial axis. When the magnet is at the bias position, the axial bias force has a magnitude of zero, so the bias force does not push or pull the magnet along the axial axis. As soon as the magnet deviates from the bias position, the bias force increases in magnitude and pushes or pulls the magnet back to the bias position. The bias force is, for example, to bring the mover to a desired position in which the mover is the majority of the time. This way, no electric power is needed when the mover is in that position. The bias force is, for example, used to move the mover into a safe position in case of an emergency in which electrical power to the electromagnetic actuator is lost. In an embodiment, one ferromagnetic ring is arranged on the tubular coil holder adjacent to the tubular coil. The ferromagnetic ring is in contact with the tubular coil or is at an axial offset from the tubular coil. In an embodiment, two ferromagnetic rings are arranged on the tubular coil holder concentrically aligned with the axial axis. Each of the two ferromagnetic rings creates a bias position. The two ferromagnetic rings are arranged on opposite sides of the tubular coil. Preferably, the one or more ferromagnetic rings are arranged in the axial direction so as not to contact the tubular coil. In such embodiment, the one or more ferromagnetic rings are at an axial offset from the tubular coil. The distance between the two ferromagnetic rings determines the distance between the two bias positions. Using two bias positions is especially advantageous in case the electromagnetic actuator is used in a switch with an on-position and an off-position. One bias position is set at a position in which the mover sets the switch in the on-position. The other bias position is set at a position in which the mover sets the switch in the off-position. Only when the switch switches from the on-position to the off-position or vice versa, electrical power is needed by the electromagnetic actuator. In particular, electrical power is needed by the electromagnetic actuator to overcome the bias force at one bias position and to move the mover until the mover is near the other bias position.

Similar to the switch, using two bias positions is especially advantageous in case the electromagnetic actuator is used in a valve with an open-position and a closed-position. One bias position is set at a position in which the mover sets the valve in the open-position. The other bias position is set at a position in which the mover sets the valve in the closed-position. Only when the valve changes from the open-position to the closed-position or vice versa, electrical power is needed by the electromagnetic actuator. The electrical power is needed by the electromagnetic actuator to overcome one bias force at one bias position and to move the mover until the mover is near the other bias position.

Instead of two ferromagnetic rings, three or more ferromagnetic rings may be arranged concentrically aligned with the axial axis. Each ferromagnetic ring generates a bias force between the coil holder and the mover. This way, more than two bias positions are created. In case of the valve, the bias positions are for example the positions of the mover in which the mover sets the valve to 0% open (closed), 25% open, 50% open, 75% open and 100% open (completely open).

In an embodiment, whereby the coil comprises two coils or two coil portions arranged along the axial direction a ferromagnetic ring may also be arranged in between the two coils or the two coil portions. In such embodiment, the ferromagnetic ring may thus be substantially arranged in a central position of the actuator. Such a ferromagnetic ring may be used to tune the reluctance force between the coil holder and the mover.

In an embodiment, the electromagnetic actuator comprises a power source. The power source is configured to provide a modulated voltage or a modulated current to the coil. The electromagnetic actuator is configured to determine the inductance of the tubular coil based on the modulated voltage and a current through the tubular coil or based on the modulated current and a voltage over the coil.

According to this embodiment, the power source provides a modulated voltage or a modulated current. Preferably, the frequency at which the voltage or the electric current is modulated is significantly higher than the frequency at which the mover is moved relative to the tubular coil holder. For example, the frequency at which the voltage or the electric current is modulated is at least 50 Hz, at least 70 Hz or at least 80 Hz or at least 100 Hz, for example in the range of 70-500 Hz, or in the range of 100-350 Hz, for example 320 Hz. For example, the frequency at which the mover is moved relative to the tubular coil holder is less than 50 Hz, for example less than 30 Hz or for example less than 10 Hz. Because of the difference between the frequency at which the voltage or the electric current is modulated the frequency at which the mover is moved relative to the tubular coil holder, the modulated voltage or modulated current has no or only very little influence on the movement or position of the mover. In addition, for example, the amplitude of the modulated voltage or the modulated current is much smaller than the maximum voltage or maximum current that is used for movement of the mover. For example, the amplitude of the modulated voltage or the modulated current is less than 5% or less than 1% or less than 0.1% or less than 0.01% of the maximum voltage or maximum current that is used for movement of the mover. By limiting the amplitude of the modulated current or the modulated voltage, audible noise and/or parasitic movement of the mover caused by the modulated current or modulated voltage is kept low. For example, the amplitude of the modulated current is less than 100 mA, for example, less than 10 mA. By making use of the relationship as indicated by formula (1), the electromagnetic actuator is configured to determine the inductance of the tubular coil based on the modulated voltage and an electrical current through the tubular coil or based on the modulated current and a voltage over the tubular coil. The control unit may comprise or may be the controller as described above. In an embodiment, the electromagnetic actuator comprises a control unit configured to calculate the inductance of the tubular coil based on the modulated voltage and an electrical current through the tubular coil or based on the modulated current and a voltage over the tubular coil. In an example, the electromagnetic actuator comprises a current sensor to detect the modulated current over the tubular coil. The current sensor provides a signal representative of the detected modulated current, either by measuring the modulated current directly, or by measuring a different property representative of the modulated current, such as an electrical resistance or a voltage. In an example, the electromagnetic actuator comprises a voltage sensor to detect the modulated voltage over the tubular coil. The voltage sensor provides a signal representative of the detected modulated voltage, either by measuring the modulated voltage directly, or by measuring a different property representative of the modulated voltage, such as an electrical resistance or an electric current.

In an embodiment, there is provided a valve for opening and closing a conduit. The valve comprises a passage, a blocking element and the electromagnetic actuator as described above. The mover is configured to move the blocking element to a first valve position and to a second valve position. The passage is adapted to be arranged in the conduit. In the first valve position, the blocking element is arranged to block the passage to restrict fluid from the conduit passing through the passage. In the second valve position, the blocking element is arranged to open the passage to allow fluid from the conduit to pass through the passage.

According to the embodiment, the valve is able to accurately move the blocking element from the first valve position to the second valve position, without the need to provide an additional position sensor to determine the actual position of the blocking element. In an embodiment, the valve is configured to move the blocking element to any position in between the first valve position and the second valve position. Alternatively, the valve is configured to move the blocking element to no or only a discreet number of positions in between the first valve position and the second valve position.

Figure 2:
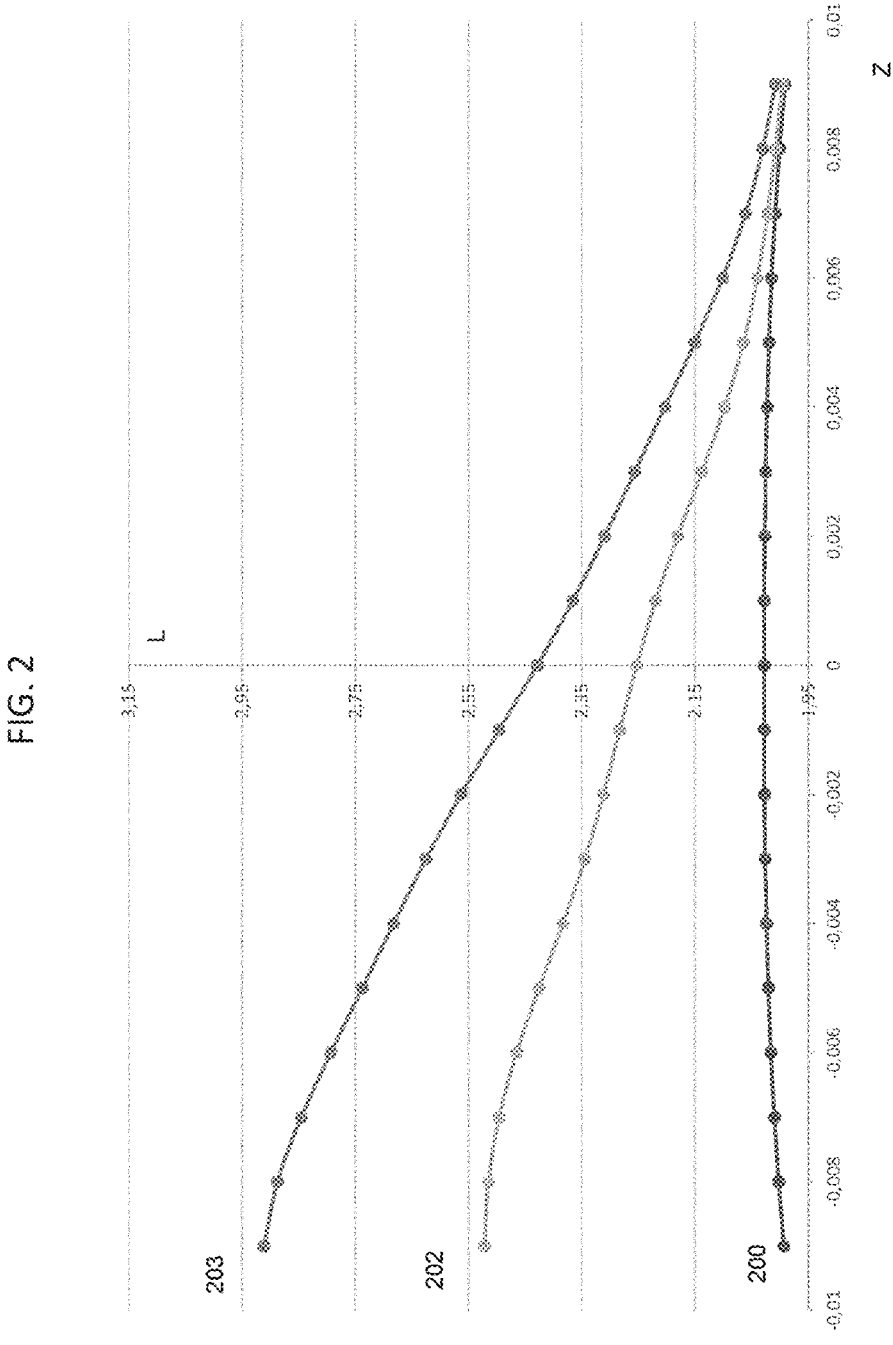

The invention will be described in more detail below under reference to the figures, in which in a non-limiting manner exemplary embodiments of the invention will be shown. The figures show in:

FIG. 1: a first embodiment according to the invention,

FIG. 2: the relationship between the position and the inductance according to the prior art and embodiments of the invention.

Figure 3:
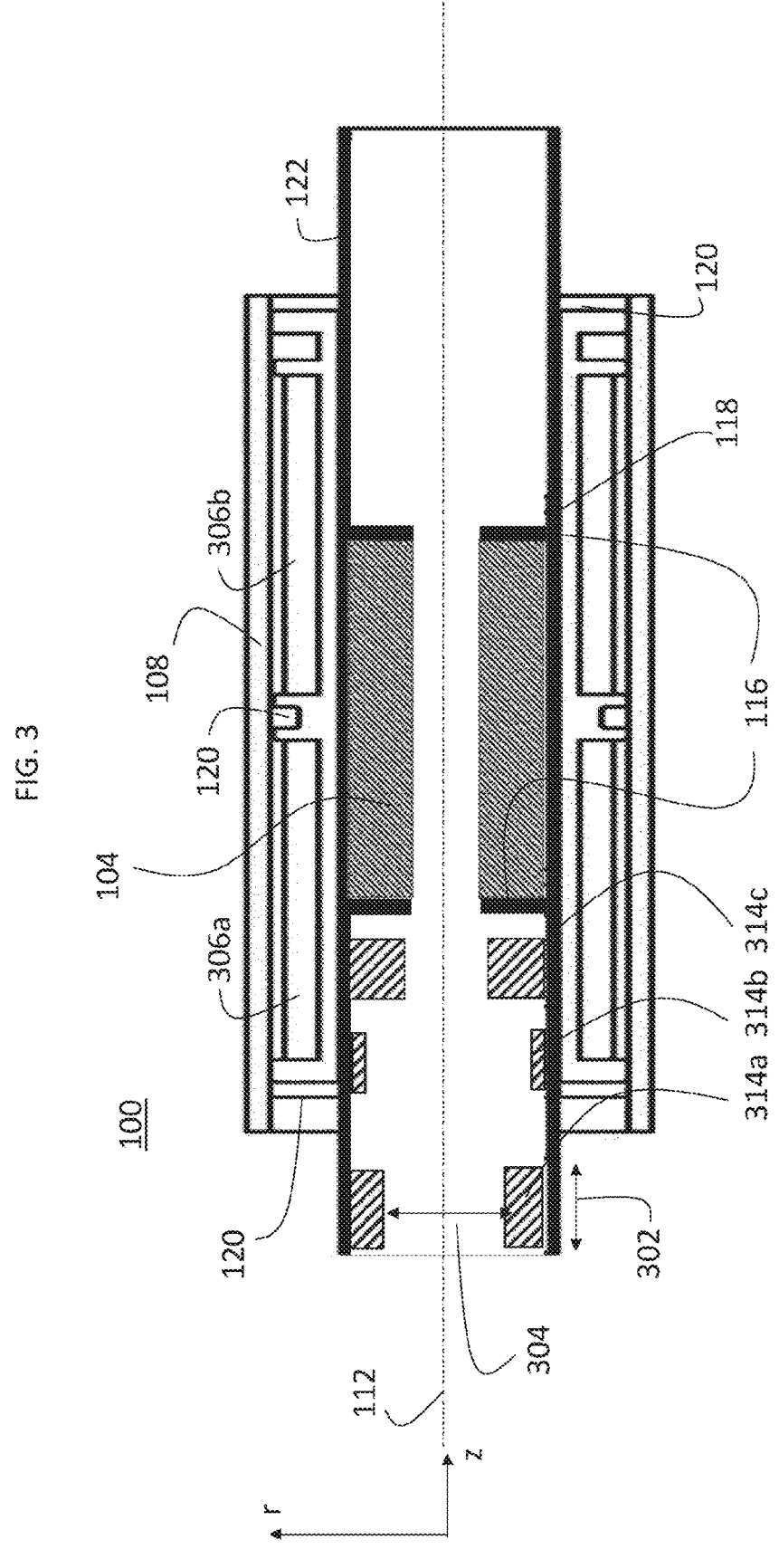

FIG. 3: a second embodiment according to the invention.

Figure 4:
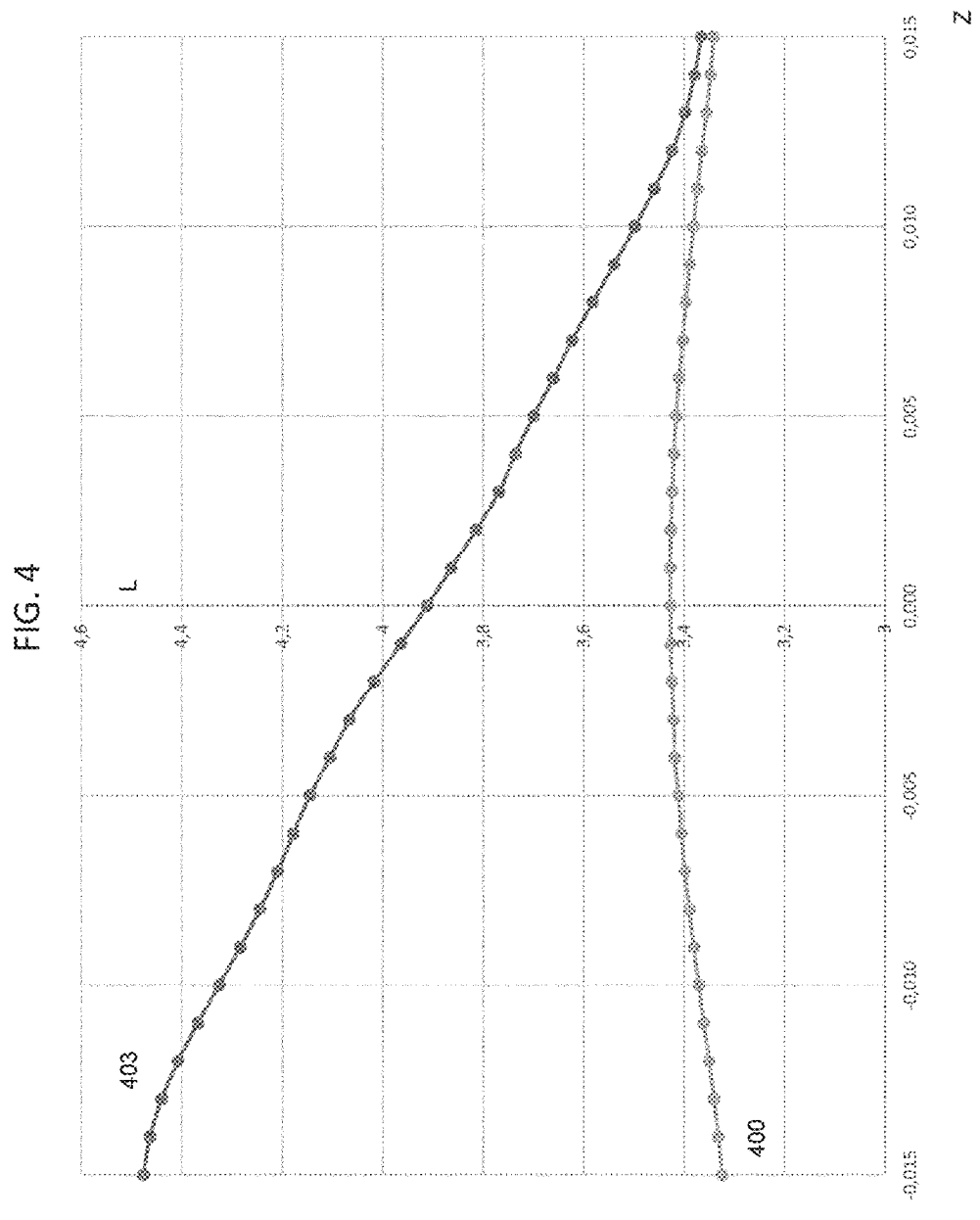

FIG. 4: the relationship between the position and the inductance according to the prior art and the second embodiment of the invention.

Figure 5:
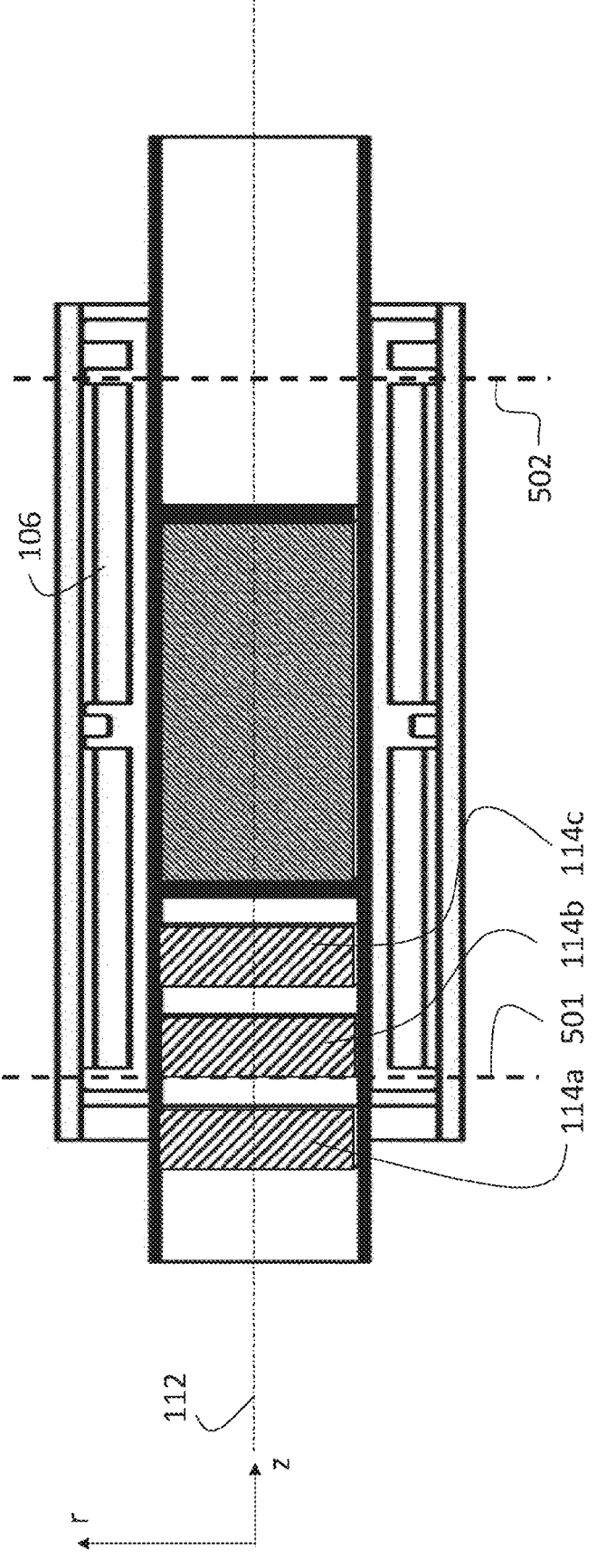

FIG. 5: a third embodiment according to the invention.

Figure 6:
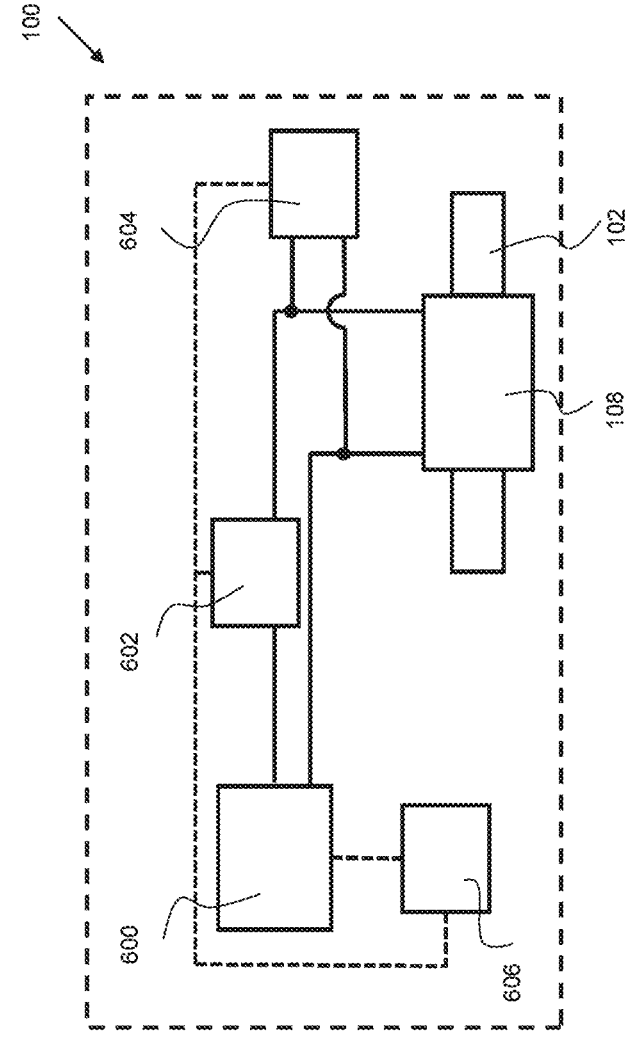

FIG. 6: a fourth embodiment according to the invention.

Figure 7:
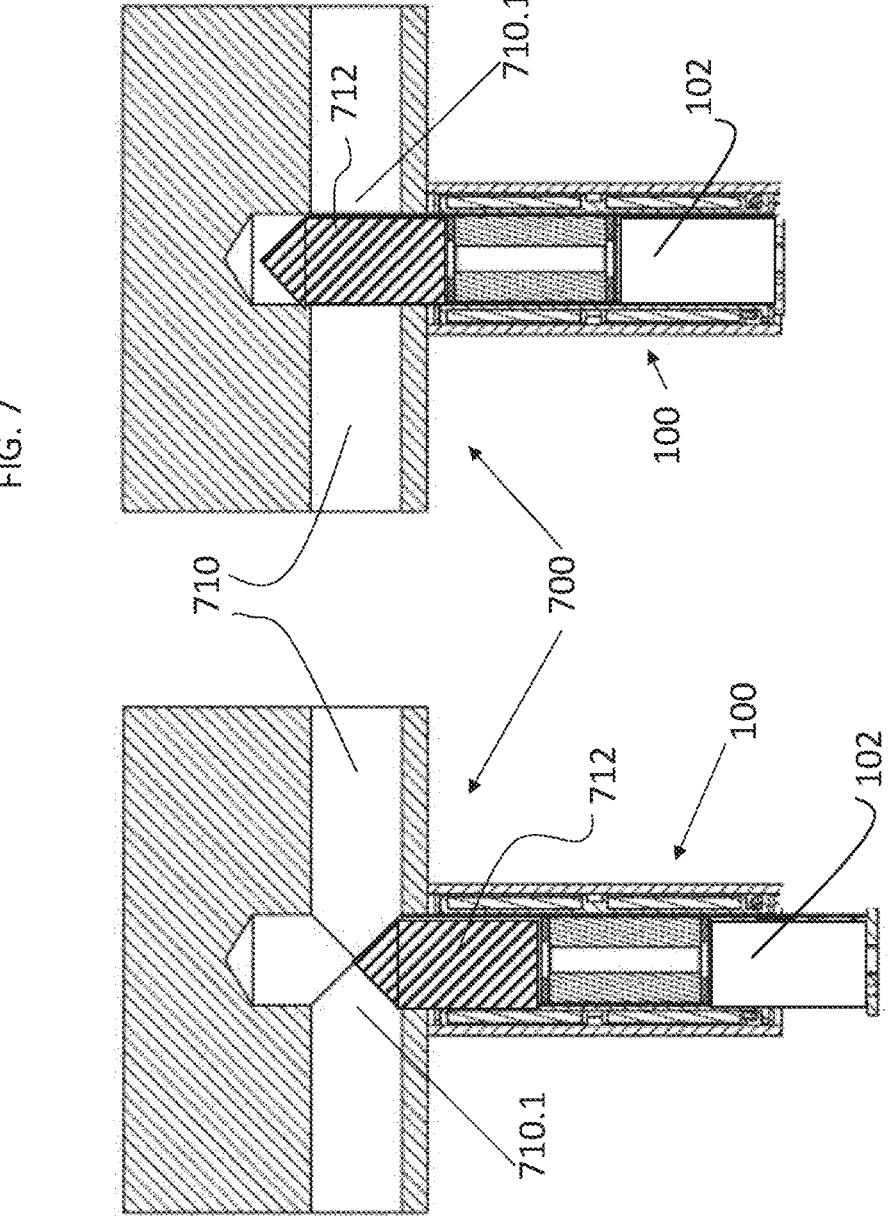

FIG. 7: a valve according to an embodiment of the invention.

FIG. 1 shows a first embodiment according to the invention. FIG. 1 shows an electromagnetic actuator 100 comprising a mover 102, a magnet 104, a tubular coil 106 and a tubular coil holder 108. The mover 102 has the magnet 104. The tubular coil holder 108 holds the tubular coil 106. The tubular coil holder 108 has a cylindrical inner space 110 for receiving the mover 102. The tubular coil 106 and the magnet 104 are configured to cooperate with each other to generate a force to move the mover 102 relative to the tubular coil holder 108 along an axial axis 112. The mover 102 comprises a ferromagnetic element 114a, 114b, 114c arranged to change an inductance of the tubular coil 106 in dependency on a position of the mover 102 relative to the tubular coil holder 108. In an alternative embodiment, the mover 102 comprises only a single ferromagnetic element 114a.

The mover 102 extends along the axial axis 112, which is represented as the z-axis. The axial axis 112 is the longitudinal axis of the mover 102. The radial axis of the mover 102 is represented by the r-axis. The r-axis is perpendicular to the z-axis. The tubular coil holder 108 and the tubular coil 106 both are tubular, so they have a cylindrical inner space 110 for receiving the mover 102. The mover 102 is able to move back and forth along the axial axis 112. The cylindrical inner space 110 constrains movement of the mover 102 relative to the tubular coil 106 holder along the radial axis. The mover 102 is able to rotate along the axial axis 112. Alternatively, additional constraints are provided to constrain the mover 102 from rotating along the axial axis 112 relative to the tubular coil holder 108.

When an electrical current flows through the tubular coil 106, the tubular coil 106 generates a magnetic field. The magnet 104 generates its own magnetic field. The interaction between the magnetic fields of the tubular coil 106 and the magnet 104 cause a magnetic force to be generated along the axial axis 112. The direction of the magnetic force depends on the direction of the electric current, whereas the magnitude of the magnetic force depends on the magnitude of the electric current. The magnetic force tries to move the tubular coil 106 and the magnet 104 into opposite directions relative to each other. Because the magnet 104 is connected to the mover 102, the mover 102 is moveable relative to the tubular coil 106. Because the tubular coil 106 is connected to the tubular coil holder 108, the mover 102 is moveable relative to the tubular coil holder 108. So by controlling the electric current through the tubular coil 106, the movement of the mover 102 relative to the tubular coil holder 108 is controlled.

Because the ferromagnetic element 114a, 114b, 114c is connected to the mover 102, the ferromagnetic element 114a, 114b, 114c moves together with the mover 102 relative to the tubular coil holder 108. When the position of the mover 102 changes, so does the position of the ferromagnetic element 114a, 114b, 114c. By moving the mover 102 relative to the tubular coil 106, the ferromagnetic element 114a, 114b, 114c is moved through the magnetic field that is generated by the tubular coil 106. As a result, the inductance of the tubular coil 106 changes in dependency of the position of the mover 102.

The magnet 104 and the ferromagnetic element 114a, 114b, 114c are arranged on the mover 102 along the axial axis 112. The magnet 104 and the ferromagnetic element 114a, 114b, 114c each have a cylindrical shape aligned with the axial axis 112. So the cylindrical shapes of the magnet 104 and the ferromagnetic element 114a, 114b, 114c are in the same orientation as the cylindrical inner space 110.

FIG. 1 shows that the ferromagnetic element 114a, 114b, 114c comprises a plurality of elements. This embodiment has three elements 114a, 114b, 114c, whereas one element, or two elements, or more than three elements are possible. The elements 114a, 114b, 114c are arranged along the axial axis 112 at a distance from each other. In an alternative embodiment, the 114a, 114b, 114c elements are arranged at an offset from the axial axis 112.

The elements 114a, 114b, 114c are at an axial distance from each other, so they are not adjacent to each other. A filler material may be provided in between the elements 114a, 114b, 114c to fill up the space between the elements. A spacer is for example placed between two elements, to set the desired distance between the two elements. In another example, air is present between two elements.

It is visible from FIG. 1 that ferromagnetic elements 114a, 114b, 114c are arranged asymmetrically relative to the magnet 104 along the axial axis 112. The arrangement is asymmetrical because there are three ferromagnetic elements 114a, 114b, 114c on the left side of the magnet 104, whereas there are no ferromagnetic elements 114a, 114b, 114c on the right side of the magnet 104 that change the inductance of the tubular coil 106 in dependency on a position of the mover 102 relative to the tubular coil holder 108. In the embodiment as shown, the mover 102 comprises two pole shoes 116. There is one pole shoe 116 on each side of the magnet 104 along the axial axis 112. Poles shoes 116 are adjacent and in contact with the magnet 104. Pole shoes 116 are configured to direct the magnetic field of the magnet 104 radially outwards and perpendicular to the tubular coil 106 to increase the efficiency of the electromagnetic actuator 100. Even though the pole shoes 116 comprise ferromagnetic material, the pole shoes 116 only have a small impact on the inductance of the tubular coil 106 in dependency on a position of the mover 102 relative to the tubular coil holder 108.

The cylindrical inner space 110 is formed by a slide bearing surface 118. The mover 102 is configured to slide over the slide bearing surface 118 along the axial axis 112. The inner cylindrical space is slightly larger than the outer diameter of the mover 102 to allow sliding of the mover 102 over the slide bearing surface 118, while constraining the mover 102 in the radial direction.

The mover 102 further comprises a stainless steel tube 122. The magnet 104 and the ferromagnetic element 114a, 114b, 114c are arranged inside the stainless steel tube 122. The stainless steel tube 122 forms a shell in which the magnet 104 and the ferromagnetic elements 114a, 114b, 114c are arranged. Items 124 can e.g. be non-magnetic end stops or interfaces to connect to a load.

The tubular coil holder 108 comprises three ferromagnetic rings 120 arranged concentrically aligned with the axial axis 112. In an embodiment, the ferromagnetic rings may also be partial rings, e.g. one or more ring segments distributed in the spaces indicated by reference numbers 120 in FIG. 1. Each of the ferromagnetic rings 120 and the magnet 104 are configured to generate a bias force between the tubular coil holder 108 and the mover 102. When the position of the magnet 104 is near the ferromagnetic ring 120 on the left side, the ferromagnetic ring 120 and the magnet 104 generate a bias force to move the magnet 104 to the ferromagnetic ring 120 on the left. The ferromagnetic ring 120 on the left will hold the mover 102 in that position when there is no electrical current through the tubular coil 106. When the position of the magnet 104 is near the ferromagnetic ring 120 on the right side, the ferromagnetic ring 120 and the magnet 104 generate a bias force to move the magnet 104 to the ferromagnetic ring 120 on the right. The ferromagnetic ring 120 on the right will hold the mover 102 in that position when there is no electrical current through the tubular coil 106. When the position of the magnet 104 is near the ferromagnetic ring 120 in the middle, the ferromagnetic ring 120 and the magnet 104 generate a bias force to move the magnet 104 to the ferromagnetic ring 120 in the middle. The ferromagnetic ring 120 in the middle will hold the mover 102 in that position when there is no electrical current through the tubular coil 106.

FIG. 2. shows the relationship between the position of the mover 102 relative to the tubular coil holder 108. On the horizontal x-axis, the z-position of the mover is indicated in [m]. On the vertical y-axis, the inductance of the coil is indicated in [mH]. Line 200 shows the relationship of a known electromagnetic actuator 100, in which no ferromagnetic element is present that changes an inductance of the tubular coil 106 in dependency on a position of the mover 102 relative to the tubular coil holder 108. Line 200 shows that there is only a small change in the inductance of the coil per unit of movement of the mover. Further, line 200 shows that the inductance goes up from the position −0.009 to the position 0, and then goes down from the position 0 to the position +0.0009. Such a variation in the inductance can e.g. be caused by the presence of pole shoes. Note the variation in the inductance is symmetrical about the position 0. This makes it more difficult for the known electromagnetic actuator 100 to determine the position, because the inductance could indicate a position on the negative side of position=0 or on the positive side.

Line 202 shows the relationship between the mover 102 and the tubular coil holder 108 according to the invention, in which there are two ferromagnetic elements. As is clearly visible from FIG. 2, line 202 changes much more per unit of movement than line 200. This allows for much more accurate measurement of the position based on the inductance of the tubular coil 106. In addition, the inductance is proportional with the position, which means that every position has a unique, corresponding inductance value.

Line 203 shows the relationship between the mover 102 and the tubular coil holder 108 according to the invention, in which there are three ferromagnetic elements 114a, 114b, 114c. This embodiment is shown in FIG. 1. By adding a total of three ferromagnetic elements 114a, 114b, 114c, the change of the inductance per unit of movement has become larger than shown with line 202.

Based on the relationship of line 202 or line 203, the electromagnetic actuator 100 is configured to control the position of the mover 102 relative to the tubular coil holder 108 based on the determined inductance of the tubular coil 106.

FIG. 3 shows a second embodiment according to the invention. This embodiment is the same as the first embodiment, except for what is explained below. The second embodiment has three ferromagnetic elements 314a, 314b, 314c. The ferromagnetic elements 314a, 314b, 314c have a cylindrical shape and are concentrically aligned with the axial axis 112. Each of the elements has a thickness different from the other elements. The direction of the thickness is parallel to the axial axis 112, as is indicated by the arrow 302. Element 314b has a larger thickness than element 314c and has a smaller thickness than element 314a. The elements 114a, 114b and 114c as described in the first embodiment may also have a thickness different from the other elements 114a, 114b and 114c.

The tubular coil 106 comprises a wire. The wire comprises a first coil 306a and a second coil 306b. The first coil 306a and the second coil 306b are wound tangentially around the cylindrical inner space 110 in a direction opposite to each other. The first coil 306a and the second coil 306b are connected to each other via a wire that extends over the ferromagnetic ring 120 in the middle.

In the embodiment of FIG. 3. each of the elements 314a, 314b and 314c has a ring shape concentrically aligned with the axial axis 112. Each of the elements 314a, 314b and 314c has an inner diameter that is different from the other elements 314a, 314b and 314c. The inner diameter is in the direction of the radial axis r, as is indicated by arrow 304. The outer diameter of the elements is the same for all elements. Because the inner diameter of each element is different, the wall thickness of each element is different as well. By tuning the thickness and the inner diameter of the elements, the inductance change of the tubular coil 106 per unit of movement of the mover 102 is optimized, as is shown in FIG. 4.

FIG. 4 shows the relationship between the inductance change of the tubular coil 106 per unit of movement of the mover 102, and the position of the mover 102 for a known electromagnetic actuator 100 as line 400. The horizontal axis represents the position of the mover 102 in [m]. The vertical axis represents the inductance of the tubular coil 106 in [mH]. Line 400 gives the same type of relationship as line 200. However, the values of line 400 are different, because the dimensions of the known electromagnetic actuator are different than those of the known electromagnetic actuator used for line 200. Of course, the correct dimensions were used in the electromagnetic actuator 100 according to the invention to make a fair comparison. The electromagnetic actuator 100 according to the second embodiment is indicated by line 403. Although the change of the inductance per unit of movement is somewhat less than in FIG. 2, far less material is used for the ferromagnetic elements 314a, 314b, 314c. Because ferromagnetic materials such as iron and nickel have a high density, the mass of the mover 102 is significantly reduced. The change of inductance per unit of movement is still much larger than that of the known electromagnetic actuator according to line 400.

FIG. 5 shows a third embodiment according to the invention. The tubular coil 106 extends in a direction along the axial axis 112 from a first plane 501 to a second plane 502. The mover 102 is moveable between a first position and a second position. In the first position at least one element 114a, 114b, 114c is in between the first plane 501 and the second plane 502. In the second position the at least one element 114a, 114b, 114c is beyond a position between the first plane 501 and the second plane 502.

The first plane 501 is a plane that is perpendicular to the axial axis 112. The start of the tubular coil 106 is at the first plane 501. The tubular coil 106 has no windings left of the first plane 501, and the first winding starts right of the first plane 501. The windings of the tubular coil 106 continue till the second plane 502. The second plane 502 is a plane that is perpendicular to the axial axis 112. The last winding of the tubular coil 106 is left of the second plane 502. The tubular coil 106 has no windings right of the second plane 502.

The mover 102 is at a position, in which element 114c is in between the first plane 501 and the second plane 502. This is referred to as the first position. The mover 102 is able to move to the left, i.e., in the negative direction along the axial axis 112, causing the element 114c to pass through the first plane 501. The mover 102 moves further to move the element 114c passed the first plane 501, so the element 114c is beyond a position between the first plane 501 and the second plane 502. The position in which the element 114c is left of the first plane 501, is referred to as the second position. In an embodiment, in the first position, all elements 114a, 114b and 114c are between the first plane 501 and the second plane 502. In an embodiment, in the first position, only one of element 114a and 114c is between the first plane 501 and the second plane 502, whereas the other elements 114b/114c or 114a/114b are beyond a position between the first plane 501 and the second plane 502. In an embodiment, in the second position, one or more of the elements 114a, 114b, 114c are right from the second plane 502.

FIG. 6 shows a fourth embodiment according to the invention. In this embodiment, the electromagnetic actuator 100 comprises a power source 600. The power source 600 is configured to provide a modulated voltage or a modulated current to the tubular coil 106. The electromagnetic actuator 100 is configured to determine the inductance of the tubular coil 106 based on the modulated voltage and a current through the tubular coil 106 or based on the modulated current and a voltage over the tubular coil 106.

The power source 600 provides an electrical current and a voltage to the tubular coil 106 in the tubular coil holder 108. A current sensor 602 measures the electrical current through the tubular coil 106, for example, by measuring the electrical current flowing out of the tubular coil 106. A voltage sensor 604 measures the voltage over the tubular coil 106 in the tubular coil holder 108. A control unit 606 is provided to control the power source 600. The control unit 606 receives information about the electrical current from the current sensor 602 and receives information about the voltage from the voltage sensor 604. In this embodiment, the power source 600, the current sensor 602, the voltage sensor 604 and the control unit 606 form part of the electromagnetic actuator 100. In an alternative embodiment, one or more of the power source 600, the current sensor 602, the voltage sensor 604 and the control unit 606 are implemented as a unit separate from the electromagnetic actuator 100.

Based on a desired position of the mover 102, the control unit 606 sends a position signal to the power source 600. The power source 600 may be a current source or a voltage source.

In case the power source 600 is a current source, the power source 600 supplies an electrical current to the tubular coil 106 in the tubular coil holder 108, based on the position signal from the power source 600. In order to determine a position of the mover, the electrical current comprises a modulated electrical current. The modulated electrical current has a frequency and an amplitude. The frequency of the electrical current is much higher than a frequency of movement of the mover 102. As such, the current as supplied to the tubular coil can e.g. comprise a component having a comparatively low frequency, said component serving to generated the desired force for displacing the mover, and a component having a comparatively high frequency, referred to as the modulated electrical current, serving to determine a position of the mover. The amplitude of the modulated electrical current is much smaller than the amplitude of the total electrical current or the component having the comparatively low frequency. The modulated electrical current is measured by the current sensor 602. The inductance of the tubular coil 106 generates a voltage based on the modulated electrical current. This voltage is measured by the voltage sensor 604. The measurement information from the current sensor 602 and the voltage sensor 604 is provided to the control unit 606. Based on the measurement information, the control unit 606 is able to determine the inductance of the tubular coil 106, for example, by using the formulas stated above. The control unit 606 is e.g. provided with calibration data or a lookup-table or an algorithm to correlate the determined inductance of the tubular coil 106 with a position of the mover 102. In an embodiment, no current sensor 602 is needed, because the control unit 606 is able to determine the required information about the modulated electrical current from the power source 600 generating said modulated electrical current.

In case the power source 600 is a voltage source, the power source 600 sends a voltage to the tubular coil 106 in the tubular coil holder 108, based on the position signal. The voltage includes a modulated voltage. The modulated voltage has a frequency and an amplitude. The frequency of the modulated voltage is much higher than a frequency of movement of the mover 102. The amplitude of the modulated voltage is much smaller than the overall amplitude of the voltage as applied. The modulated voltage is measured by the voltage sensor 604. The inductance of the tubular coil 106 generates an electrical current based on the modulated voltage. The electrical current is measured by the current sensor 602. The measurement information from the current sensor 602 and the voltage sensor 604 is provided to the control unit 606. Based on the measurement information, the control unit 606 is able to determine the inductance of the tubular coil 106, for example, by using the formulas stated above. The control unit 606 can e.g. be provided with calibration data or a lookup-table or an algorithm to correlate the determined inductance of the tubular coil 106 with a position of the mover 102. In an embodiment, no voltage sensor 604 is needed, because the control unit 606 is able to determine the required information about the modulated voltage from the power source 600 generating said modulated voltage.

The electromagnetic actuator 100 described in the fourth embodiment can be combined with the mover 102 and/or the tubular coil holder 108 of any of the embodiments described above.

FIG. 7 shows a valve 700 according to an embodiment of the invention. The valve is for opening and closing a conduit 710. The valve comprises a passage 710.1, a blocking element 712 and the electromagnetic actuator 100 according to any of the embodiments described above. The drawing on the left schematically shows the valve 700 in an open position, the drawing on the right shows the valve 700 in a closed position. In accordance with the invention, the mover 102 of the actuator 100 is configured to move the blocking element 712 to a first valve position and to a second valve position. In the first valve position, the blocking element 712 is arranged to open the passage 710.1 to allow fluid from the conduit to pass through the passage. In the first valve position, the blocking element is arranged to block the passage to restrict fluid from the conduit passing through the passage.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word "a" used herein means one or more than one, unless specified otherwise. The phrase "a plurality of" means two or more than two. The words "comprising" and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. An electromagnetic actuator, comprising
a mover having a magnets;
a tubular coil;
a tubular coil holder holding the tubular coil,
wherein the tubular coil holder has an inner space for receiving the mover;
wherein the tubular coil and the magnet are configured to cooperate with each other to generate a force to move the mover relative to the tubular coil holder along an axial axis,
wherein the mover comprises a ferromagnetic element arranged to change an inductance of the tubular coil in dependency on a position of the mover relative to the tubular coil holder,
wherein the magnet and the ferromagnetic element are arranged on the mover at an axial offset from each other,
wherein the ferromagnetic element comprises a plurality of elements, wherein the elements are arranged along the axial axis at a distance from each other, and
wherein the elements are arranged asymmetrically relative to the magnet along the axial axis.

2. The electromagnetic actuator according to claim 1, wherein each of the magnet and the ferromagnetic element is aligned with the axial axis.

3. The electromagnetic actuator according to claim 1, wherein the ferromagnetic element is arranged on the mover non-rotational-symmetrical relative to the axial axis.

4. The electromagnetic actuator according to claim 1, wherein the mover comprises a pole shoe arranged adjacent to and in contact with the magnet,
wherein the pole shoe is configured to direct a magnetic field of the magnet,
wherein the ferromagnetic element is arranged at an axial offset from the pole shoe.

5. The electromagnetic actuator according to claim 1, wherein each of the elements is concentrically aligned with the axial axis, wherein each of the elements has a thickness in the direction of the axial axis different from the other elements.

6. The electromagnetic actuator according to claim 1, wherein the tubular coil extends in a direction along the axial axis from a first plane to a second plane, wherein the mover is moveable between a first position and a second position, wherein in the first position at least one element is in between the first plane and the second plane, wherein in the second position the at least one element is beyond a position between the first plane and the second plane.

7. The electromagnetic actuator according to claim 1, wherein the inner space is formed by a slide bearing surface, wherein the mover is configured to slide over the slide bearing surface along the axial axis.

8. The electromagnetic actuator according to claim 1, wherein the mover comprises a stainless steel tube, wherein the magnet and the ferromagnetic element are arranged inside the stainless steel tube.

9. The electromagnetic actuator according to claim 1, wherein the tubular coil comprises a first coil and a second coil, wherein the first coil and the second coil are wound tangentially around the inner space in a direction opposite to each other.

10. The electromagnetic actuator according to claim 1, wherein the tubular coil holder comprises a ferromagnetic ring arranged concentrically aligned with the axial axis, wherein the ferromagnetic ring and the magnet are configured to generate an axial bias force between the tubular coil holder and the mover.

11. The electromagnetic actuator according to claim 1, comprising a power source, wherein the power source is configured to provide a modulated voltage or a modulated current to the tubular coil, wherein the electromagnetic actuator is configured to determine the inductance of the tubular coil based on the modulated voltage and a current through the tubular coil or based on the modulated current and a voltage over the tubular coil.

12. A valve for opening and closing a conduit, comprising
a passage;
a blocking element and
the electromagnetic actuator according to claim 1,
wherein the passage is adapted to be arranged in the conduit,
wherein the mover is configured to move the blocking element to a first valve position and to a second valve position,
wherein, in the first valve position, the blocking element is arranged to block the passage to restrict fluid from the conduit passing through the passage,
wherein, in the second valve position, the blocking element is arranged to open the passage to allow fluid from the conduit to pass through the passage.

13. An electromagnetic actuator, comprising
a mover having a magnet;

a tubular coil;
a tubular coil holder holding the tubular coil;
wherein the tubular coil holder has an inner space for receiving the mover;
wherein the tubular coil and the magnet are configured to cooperate with each other to generate a force to move the mover relative to the tubular coil holder along an axial axis,
wherein the mover comprises a ferromagnetic element arranged to change an inductance of the tubular coil in dependency on a position of the mover relative to the tubular coil holder,
wherein the magnet and the ferromagnetic element are arranged on the mover at an axial offset from each other,
wherein the electromagnetic actuator is configured to determine the inductance of the tubular coil, wherein the electromagnetic actuator is configured to control the position of the mover relative to the tubular coil holder based on the determined inductance of the tubular coil.

14. An electromagnetic actuator comprising
a mover having a magnet;
a tubular coil;
a tubular coil holder holding the tubular coil,
wherein the tubular coil holder has an inner space for receiving the mover;
wherein the tubular coil and the magnet are configured to cooperate with each other to generate a force to move the mover relative to the tubular coil holder along an axial axis,
wherein the mover comprises a ferromagnetic element arranged to change an inductance of the tubular coil in dependency on a position of the mover relative to the tubular coil holder,
wherein the magnet and the ferromagnetic element are arranged on the mover at an axial offset from each other,
wherein the ferromagnetic element comprises a plurality of elements, wherein the elements are arranged along the axial axis at a distance from each other, and
wherein each of the elements has a ring shape concentrically aligned with the axial axis, wherein each of the elements has an inner diameter that is different from the other elements.

*   *   *   *   *